Feb. 9, 1943.　　　　E. A. WILBANKS　　　　2,310,332
MULTIPLE CHECK
Filed April 11, 1942
*Fig. 1.*
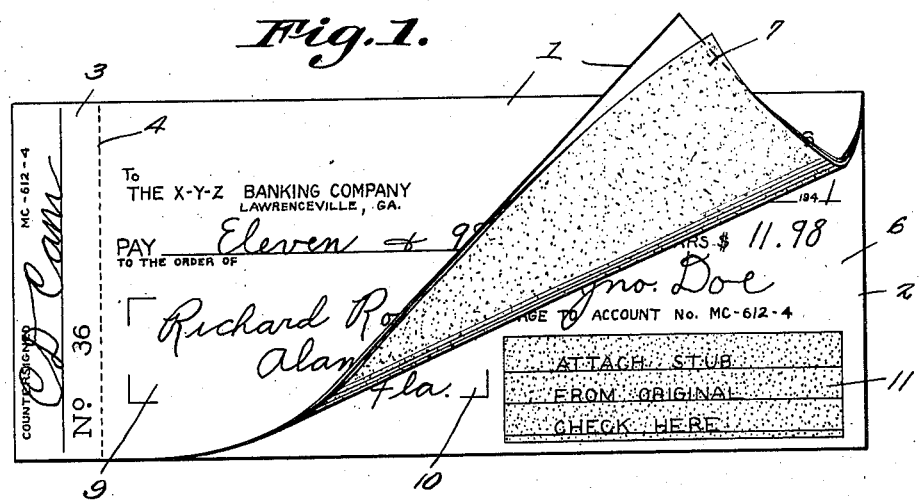
*Fig. 2.*
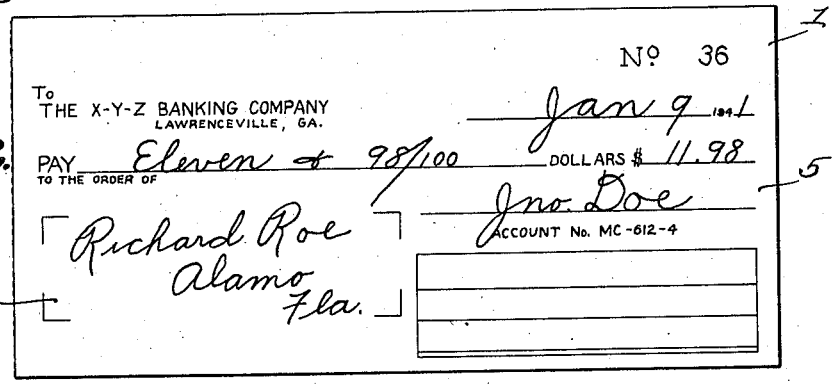
*Fig. 3.*
E. A. Wilbanks
INVENTOR.
BY Patented Feb. 9, 1943

2,310,332

UNITED STATES PATENT OFFICE 2,310,332

MULTIPLE CHECK

Early A. Wilbanks, Buford, Ga.

Application April 11, 1942, Serial No. 438,642

2 Claims. (Cl. 282—22)

This invention relates to a multiple check for use in banking, one of the objects being to provide a means whereby a bank on which a check is drawn can quickly determine whether or not a presented check has been altered or improperly drawn.

A further object is to provide a multiple check the use of which enables a person, who does not have a checking account, to withdraw funds held to his credit in the account of another person so that a number of people thus can operate their bank accounts through one central account, thereby relieving banks of small "nuisance" accounts with which all of them are burdened.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing:

Figure 1 is a perspective view of a multiple check embodying the present improvements.

Figure 2 is a plan view of the original of the check with the stub thereof removed.

Figure 3 is a plan view of the duplicate of the check, the stub of the original being applied thereto.

Referring to the figures by characters of reference, 1 designates the original portion of the check while 2 designates the duplicate portion thereof. The original portion has a stub 3 at one end thereof which can be torn off along a weakened line 4. The original is provided with the usual space 5 for receiving the signature of the drawer while the stub 3 has a space for receiving the signature of the countersigner.

The duplicate portion 2 of the check has a space 6 corresponding with the space 5 to which a duplicate of the drawer's signature can be transferred through an interposed carbon sheet 7 or the like. Instead of being provided with a separable stub portion, however, the duplicate portion has a space 8 located where it will receive a duplicate of the signature of the countersigner when transferred thereto through the interposed transfer material. Both portions of the check are also provided with spaces 9 and 10 respectively for receiving the name of the payee. At a suitable point on the duplicate portion 2 of the check is an area which can be coated with a normally dry adhesive 11, this area being substantially the same size as the stub 3.

Most banks have a number of small or "nuisance" accounts which are handled at a loss unless an adequate service charge is made but service charges frequently are objected to by the customers of banks.

By utilizing a multiple check such as constitutes the present invention, a number of persons having no bank account can make arrangements whereby checks can be drawn by them on a single account. Under this arrangement the original check may be signed by the drawer in the space 5 provided but before it is delivered to the payee, it is necessary for the person having the bank account to countersign the same in the space provided on the stub 3. After the check has been drawn and signed by the payee and then countersigned as explained, all of the data applied to the original portion of the check will be duplicated on the portion 2. The original portion is then presented to the drawer while the duplicate portion is deposited for future reference in the bank holding the account. When the payee presents the original of the check at the bank, it is compared with the duplicate being held for reference and if it is found that they are identical, the stub 3 is torn along line 4 from the original and applied to the adhesive 11 on the duplicate portion. Thus the duplicate portion will contain the original signature of the countersigner and both the original and the duplicate can then be returned to the countersigner who, in turn, can forward the original to the drawer. By following the foregoing procedure persons having no bank accounts can nevertheless use checks in payment of bills, etc. Obviously by using checks of this kind in the manner stated the banks involved would be relieved of small accounts and it would be possible to detect promptly any checks that might have been forged or altered prior to presentation for payment.

While the present invention is especially useful in the manner described, it can also be employed where two different signatures are required, as where checks are initially signed by an employee and require also the signature of the employer.

Although only the original and one duplicate portion have been shown and described, it is to be understood that several duplicate portions might be used, only one of them, however, being gummed to receive the detached stub of the original. Furthermore, instead of using an adhesive for joining the stub to the duplicate, other means, such as a paper fastener, could be employed.

It is to be understood of course that the portions of the check indicated at 1 and 2, as well as the transfer portion 7, if a separate part, can all be suitably joined along one edge in pad or book form by any suitable means.

What is claimed is:

1. In a multiple check, separable original and duplicate sheets normally connected, each having a main portion provided with an appropriately designated space for the signature of the drawer and an end portion provided with an appropriately designated space for the signature of the countersigner, said end portion of the main portion of the check constituting a removable stub, means interposed between the original and the duplicate portion for transferring to the duplicate portion a copy of all matter written on the original portion, there being an appropriately designated area on the duplicate portion proportioned to receive the stub when removed from the original portion, and means for attaching said stub to the duplicate portion in said last named appropriately designated area.

2. In a multiple check, separable original and duplicate sheets normally connected, each having a main portion provided with an appropriately designated space for the signature of the drawer and an end portion provided with an appropriately designated space for the signature of the countersigner, said end portion of the main portion of the check constituting a removable stub, means interposed between the original and the duplicate portion for transferring to the duplicate portion a copy of all matter written on the original portion, there being an appropriately designated area on the duplicate portion proportioned to receive the stub when removed from the original portion, and an adhesive for attaching said stub to the duplicate portion in said last named appropriately designated area.

EARLY A. WILBANKS.